Oct. 11, 1927.	1,644,896
H. BUSEKIST-SCHARNWEBER
AUTOGENOUS WELDING AND ELECTRODE GUIDING MACHINE
Filed Jan. 8, 1926	3 Sheets-Sheet 2

Oct. 11, 1927. 1,644,896
H. BUSEKIST-SCHARNWEBER
AUTOGENOUS WELDING AND ELECTRODE GUIDING MACHINE
Filed Jan. 8, 1926 3 Sheets-Sheet 3

Patented Oct. 11, 1927.

1,644,896

UNITED STATES PATENT OFFICE.

HEINRICH BUSEKIST-SCHARNWEBER, OF BRUHLHOF-KIRCHEN-ON-THE-SIEG, GERMANY.

AUTOGENOUS WELDING AND ELECTRODE-GUIDING MACHINE.

Application filed January 8, 1926, Serial No. 80,063, and in Germany February 19, 1924.

In almost all metal-working workshops the hard-solder or welding burners play a very important part. As nowadays almost all hard-soldering or welding work is carried out by hand it is rather difficult to find a sufficient number of skilled workmen. In order to avoid the working by hand and the inconveniences resulting from the same, amongst which one of the most important is that the quality of the welding depends entirely on the skill of the workman, the hereinafter described autogenous-welding- and electrode-guiding machine has been created. In consideration of the effect that nowadays welding is not only used for inferior sheet metal work but also in the building of boilers, apparatus, ships and pipe-conduits it is evident that serious inconveniences are caused by welding of inferior quality.

The working by hand causes considerable loss of gas, and it is not often possible to make a long welding-seam without repeated interruption of work. These interruptions of work are due to frequent failing of the welding-burners owing to excessive heating of the nozzles or to the fact that the burner is not held in the proper direction, and much gas and time are lost in this manner. The cooling of the burner, the re-adjusting of the same, the re-heating of the welding-point and of the sheet metal causes considerable expense and is prejudicial to the material owing to the fluctuating tensions.

Similar inconveniences are caused also at the electro-welding. The solder material is generally fed by hand and the quality of the welding depends entirely on the skill of the welder. In both cases the hard-solder is in the shape of a rod of a thickness from 5 to 8 mms. The hard-solder is heated at the autogenous welding, together with the material to be welded by the welding flame up to the melting state and they are thus united to a whole, whilst at the electro-welding the rod of hard-solder serves as electrode, this rod and the material to be welded together being under current and molten together by the arc light.

The manner in which the welding material is supplied is in both cases the same so that the machine, which will be hereinafter described and which is illustrated by way of example in the accompanying drawings, may be used for autogenous-welding as well as for electro-welding. Only slight modifications are necessary in the latter case, owing to the insulation of the feeding mechanism.

The improved machine is shown in the accompanying drawing in

Fig. 1 in side elevation and in

Fig. 2 in front elevation.

Figure 1:
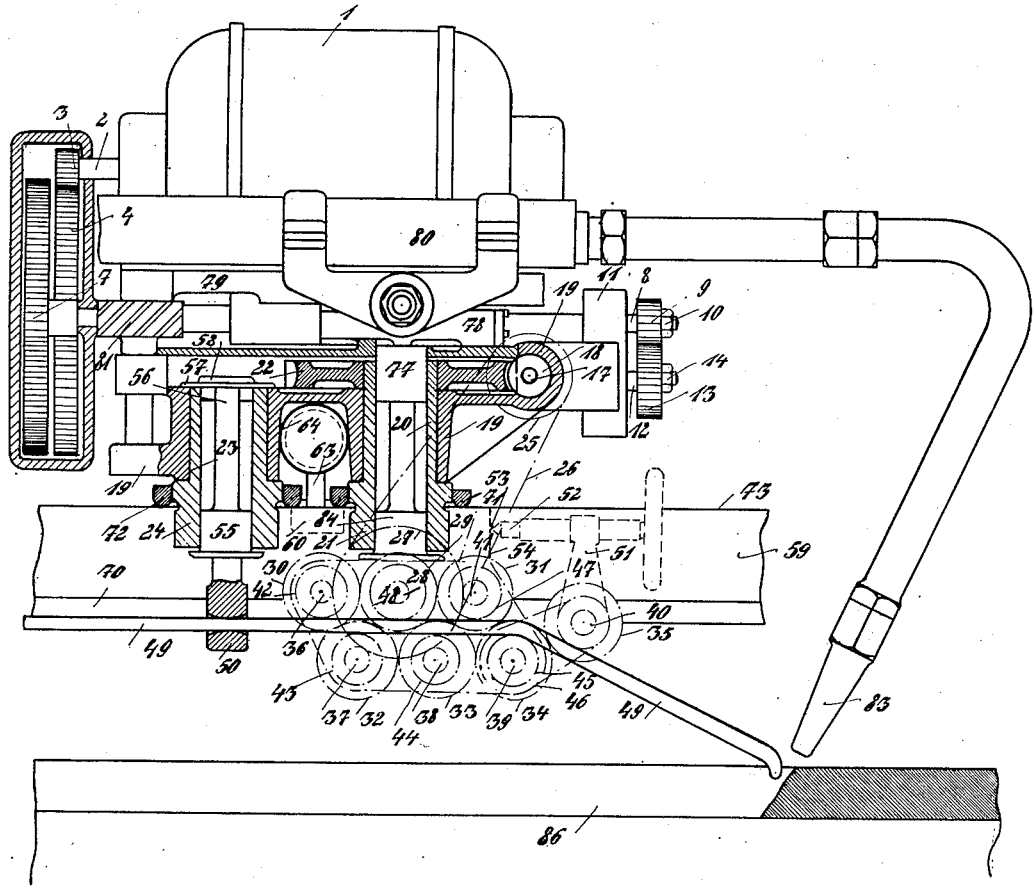

The shaft 2 and the pinion 3 keyed on said shaft are revolved at high speed from the electromotor 1. This revolving movement is transmitted upon a gear wheel 4 keyed on a shaft 5 and, by a pinion 6 keyed on the same shaft, upon a gear wheel 7 and the shaft 8 of said gear wheel. A pinion 9 is fixed on the other end of said shaft 8 by means of a nut 10 so that it can be exchanged. In the bearing bracket 11 of shaft 8 a second shaft 12 is journaled which carries on the one end a gear wheel 13 removably fixed by means of a nut 14 and meshing with the pinion 9. Bevel wheels 15, 16 serve to revolve a shaft 17 on which a worm 18 is mounted. The part 19 of the casing which encloses the worm serves further as bearing for a hollow cylinder 20 which at its free lower end forms a guide roller 21. On the cylinder 20 a worm wheel 22 is mounted which is driven from the worm 18. A second cylinder 23 is mounted in the casing 19 the free end of said cylinder forming a guide roller 24.

Figure 3:
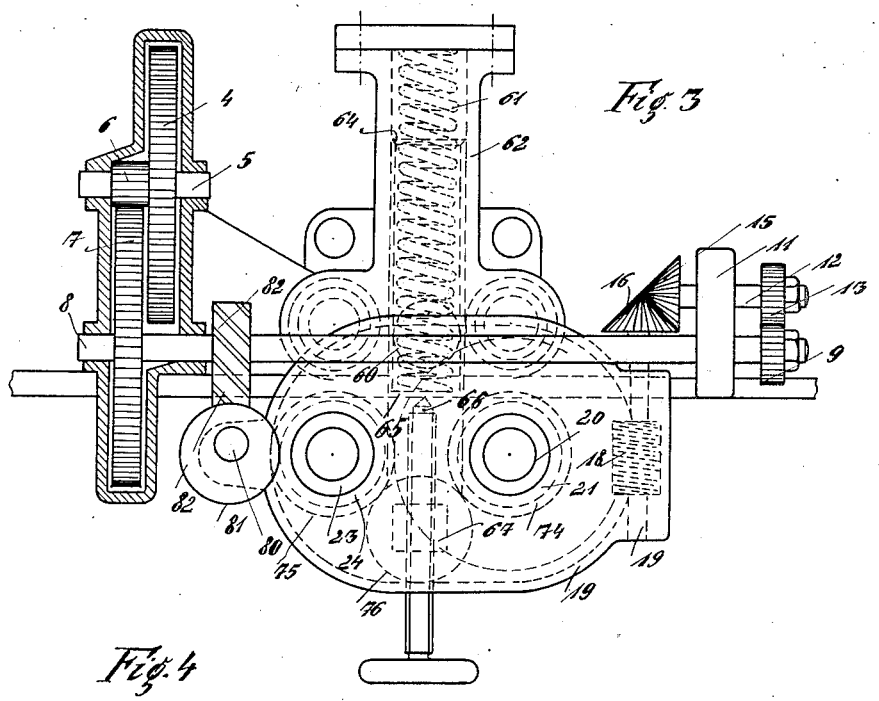
Fig. 3 is a plan view of Fig. 1 the driving motor being omitted.

The cylinders 20, 23 may serve as shafts for the toothed crowns 74, 75, indicated only in Fig. 3, and meshing with a toothed wheel 76. In this manner the movement of the cylinder 20 controlled from the motor 1 is transmitted upon the cylinder 23 so that the two guide rollers 21, 24 revolve uniformly.

On the worm shaft 17 a cord pulley 25 is mounted the rotating movement of which is transmitted by a cord 26 to a cord pulley 27. On the shaft 28 of the cord pulley 27 a gear wheel 29 is keyed which meshes with gear wheels 32, 33, 34, 35. On shafts 36, 37, 38, 39, 40, 28, 41 disks 42—48 are arranged which serve for guiding the rod 49 of hard-solder. The said disks 42 to 48 have grooved circumferences in accordance with the cross section of the rod of hard-solder.

As can be seen from Fig. 1 the rod 49 is pulled out of the holder 50 in horizontal direction to be bent in downward direction, The roller 46 which effects the bending of rod 49 is adjustably arranged and adapted to be adjusted by any convenient mechanism. With this object in view the bearing bracket 51 has an adjusting screw 52 the point 53 of which bears against a support 54. The holder 50 is guided in the cylinder 23 by a piston 55 and its extension 56 traverses the holding plate 57, an element 58 serving to securely hold said extension in its position.

Figure 2:
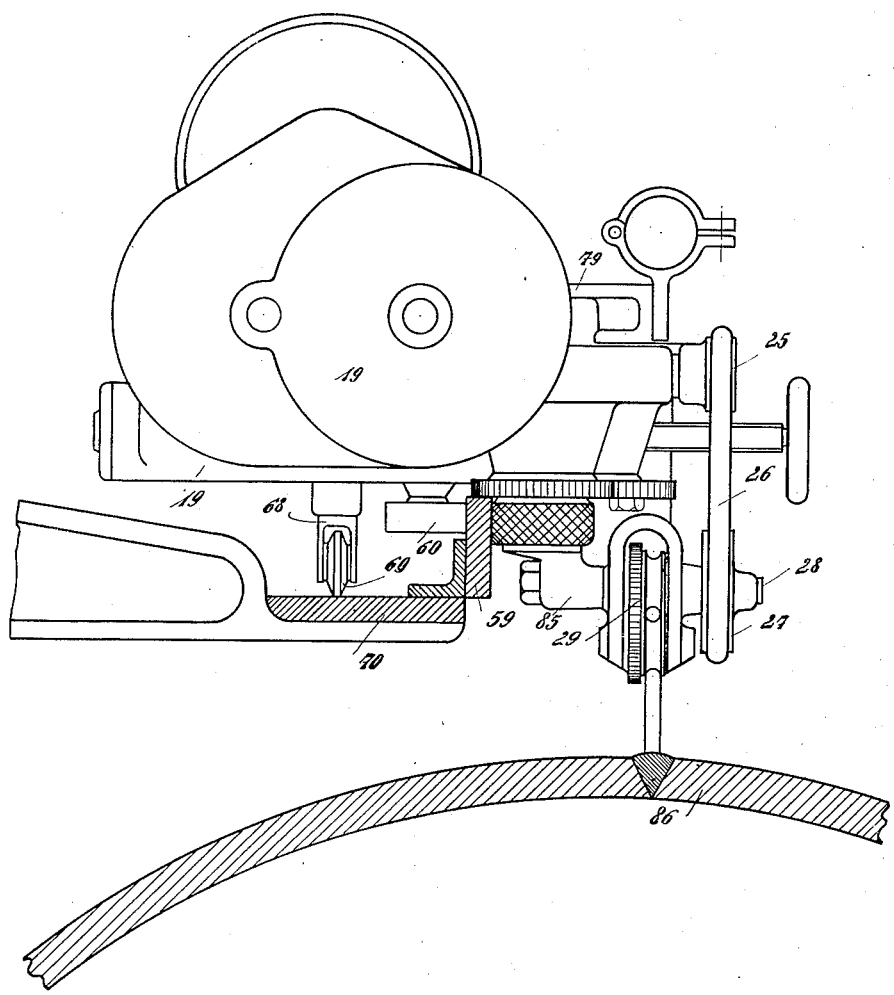

The guide rollers 21, 24 roll upon the stencil 59 and opposite said guide rollers a pressure roller 60 is guided also upon said stencil (Fig. 2). The arrangement of the pressure roller 60 is clearly shown in Figs. 1 and 3. A spring 61 located in a casing 62 serves to press the roller 60 on the stencil 59. With this object in view the roller 60 is connected by its axle 63 with a cylinder 64 arranged in the casing 62, the spring 61 pressing against the bottom plate 65 of said cylinder. The pressure of the spring is regulated by an adjusting screw 66 connected by a bearing bracket 67 with the portion 19 of the frame.

In fork-shaped supports 68 guide rollers 69 are further arranged which roll upon the portion 70 of the working stencil. In order to further support the weight of the machine the guide rollers 21, 24 have crowns 71, 72 resting upon the circumferential surface 73 of the stencil 59. The cylinders 20, 23 may serve as shafts for the toothed crowns 74, 75 indicated only in Fig. 3 and meshing with a toothed wheel 76. In this manner the movement of the cylinder 20 controlled from the motor 1 is transmitted upon the cylinder 23 so that the two guide rollers 21, 24 revolve uniformly.

Owing to the fact that the two guide rollers 21, 24 intercept a portion of the weight of the machine and that the two guide rollers are connected with one another an increased friction is produced which is absolutely necessary to move the machine through narrow curves. In the bore of one of the guide rollers e. g. of the cylinder 20 a piston 77 with support 78 is arranged in the upper end of said bore. The guide bow 79 connected with this support is rigidly connected with the welding burner 80 and adapted to be moved within predetermined limits by an eccentric 81 of a worm wheel 82. This worm wheel meshes with a corresponding wheel 83 on shaft 8. Owing to this arrangement the eccentric movement must be transmitted upon the guide bow 79 and upon the end 84 of the burner. An adjusting screw in the support 78 serves for regulating the movement of the welding burner in accordance with the thickness of the metal sheets to be welded together.

In order to arrange the disks 42—48 in the manner described above, a piston 84 is arranged in the lower free end of cylinder 20, said piston 84 forming at its end a support 85 for a roller.

When the electromotor has been started the machine begins to move uniformly at a speed corresponding with the constant speed of said electromotor. The welding-burner 80 is not only guided permanently in the same uniform manner over the sheets to be welded it is also oscillated so that the edges of the welding seam are heated over a sufficient extent and properly prepared for the reception of the solder. The rod 49 of hardsolder is moved continuously towards the flame of the welding burner in a direction opposite to the direction of movement of the machine and the solder in molten state is taken up by the joint 86 to be welded and well distributed by the blow pipe flame. The advance of the machine on the working stencil and the advancing of the solder material can be regulated by means of the change speed wheels 9, 13 in accordance with the thickness of the plates of sheet metal to be welded together. The form of construction of the machine as described and shown presents the great advantage that plates and shell rings of great weight can be welded on the spot so that difficult transporting is avoided.

Figure 4:
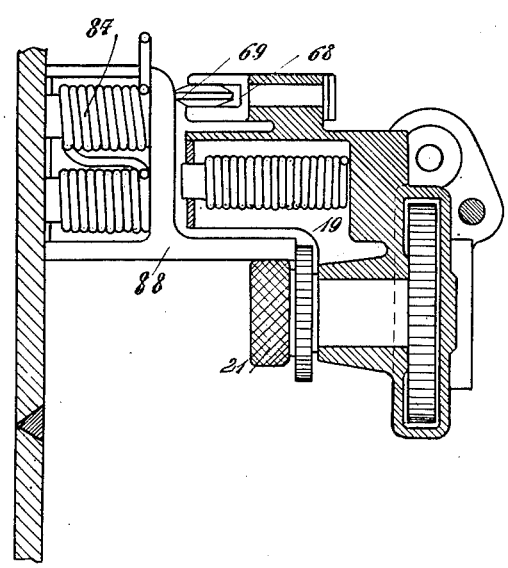
Fig. 4 is a section on A—B of Fig. 3.

Suppose that the sheet metal plates, shown in Fig. 1 in section, be vertical, for instance a shell plating of a ship, the machine, owing to its weight, would have the tendency to slip off the working stencil in rearward direction notwithstanding sufficient spring tension. In order to prevent this, magnet coils 87 are arranged opposite the guide rollers 21 in the casing 19, as shown in Fig. 4, which magnet coils pull the machine permanently against the working stencil 88. The current for the magnet coils may be taken from the cable which supplies the current to the motor. With the welding of ship shells the difficulty is further connected that there are no holes for fixing the stencil, and if such holes were provided they would have to be subsequently closed by welding which evidently would cause considerable expense. This inconvenience is obviated at the welding with the machine by holding the guide stencil by electro-magnets.

I claim:—

1. A machine for the welding of straight sheet-metal plates, boiler shell-rings, outer shells for vessels, shells for apparatus and pipings, and the like, comprising, in combination, an electromotor, a welding burner, means for manipulating the burner and means for holding and supplying the welding rod to the weld, a casing carrying said burner and said rod, a working stencil guiding said casing, two hollow cylinders enclosed in the casing and adapted to serve as driving and guide rolls and contacting with said stencil on one side of the same, pistons in said cylinder, a welding head, a bow guiding this head and being carried by one of said pistons, a welding wire, a bow guiding this wire and being carried by the other of said pistons, counter roll contacting with the said stencil on the other side of the same, running rolls located at right angles with respect to said cylinders between the welding burner and the working stencil, and means for transmitting motion from the said motor to the said cylinders.

2. A machine for the welding of straight sheet-metal plates, boiler shell-rings, outer shells for vessels, shells for apparatus and pipings, and the like, comprising, in combination, an electromotor, a welding burner, means for manipulating the burner and means for holding and supplying the welding rod to the weld, a casing carrying said burner and said rod, a working stencil guiding said casing, two hollow cylinders enclosed in the casing and adapted to serve as driving and guide rolls, and contacting with said stencil on one side of the same, cogged rims on said cylinders, a cog-wheel meshing with both cogged rims, a yielding counter roll contacting with the said sencil on the other side of the same, running rolls located at right angles with respect to said cylinders between the welding burner and the working stencil, and means for transmitting motion from the said motor to the said cylinders.

3. A machine for the welding of straight sheet-metal plates, boiler shell rings, outer shells for vessels, shells for apparatus and pipings and the like, comprising, in combination an electromotor, a welding burner, means for manipulating the burner and means for holding and supplying the welding rod to the weld, a set of rolls adapted to guide said rod, a belt-gear and intermediate wheels transmitting motion from the electromotor to said set of rolls, an adjustable roll adapted to bend the said rod in the direction to the welding point, a casing carrying said burner and said rod, a working stencil guiding said casing, two hollow cylinders enclosed in the casing and adapted to serve as driving and guide rolls, and contacting with said stencil on one side of the same, a yielding counter roll contacting with the said stencil on the other side of the same, running rolls located at right angles with respect to said cylinders between the welding burner and the working stencil, and means for transmitting motion from the said motor to the said cylinders.

4. A machine for the welding of straight sheet-metal plates, boiler shell rings, outer shells for vessels, shells for apparatus and pipings and the like, comprising, in combination an electromotor, a welding burner, means for manipulating the burner and means for holding and supplying the welding rod to the weld, a casing carrying said burner and said rod, a working stencil guiding said casing, two hollow cylinders enclosed in the casing and having collars bearing on said stencil, a yielding counter roll contacting with the said stencil on the other side of the same, running rolls located at right angles with respect to said cylinders between the welding burner and the working stencil, and means for transmitting motion from the said motor to the said cylinders.

5. A machine for the welding of straight sheet-metal plates, boiler shell rings, outer shells for vessels, shells for apparatus and pipings and the like, comprising in combination an electromotor, a welding burner, means for manipulating the burner and means for holding and supplying the welding rod to the weld, a casing carrying said burner and said rod, a working stencil guiding said casing, an electromagnet mounted on the stencil and adapted to retain the welding burner at it, two hollow cylinders enclosed in the casing and adapted to serve as driving and guide rolls, and contacting with said stencil on one side of the same, a yielding counter roll contacting with the said stencil on the other side of the same, running rolls located at right angles with respect to said cylinders between the welding burner and the working stencil, and means for transmitting motion from the said motor to the said cylinders.

6. A machine for the welding of straight sheet-metal plates, boiler shell rings, outer shells for vessels, shells for apparatus and pipings and the like, comprising in combination an electromotor, a welding burner, means for manipulating the burner and means for holding and supplying the welding rod to the weld, a casing carrying said burner and said rod, a working stencil guiding said casing, an electromagnet mounted on the stencil and adapted to retain the same at the work-piece, two hollow cylinders enclosed in the casing and adapted to serve as driving and guide rolls and contacting with said stencil on one side of the same, a yielding counter roll contacting with the said stencil on the other side of the same, running rolls located at right angles with respect to said cylinders between the welding burner and the working stencil and means for transmitting motion from the said motor to the said cylinders.

In testimony whereof I affix my signature.

HEINRICH BUSEKIST-SCHARNWEBER.